(12) United States Patent
Hada (10) Patent No.: US 11,649,048 B2
(45) Date of Patent: May 16, 2023

(54) WALL SCALING UNMANNED AIRCRAFT AND METHOD OF CONTROLLING

(71) Applicant: FUJITSU LIMITED, Kawasaki (JP)

(72) Inventor: Yoshiro Hada, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 854 days.

(21) Appl. No.: 16/376,742

(22) Filed: Apr. 5, 2019

(65) Prior Publication Data

US 2020/0023967 A1 Jan. 23, 2020

(30) Foreign Application Priority Data

May 31, 2018 (JP) .............................. JP2018-105237

(51) Int. Cl.
| | |
|---|---|
| *B64C 25/36* | (2006.01) |
| *B64U 60/00* | (2023.01) |
| *B64C 39/02* | (2023.01) |
| *B64D 35/02* | (2006.01) |
| *B64D 47/08* | (2006.01) |

(Continued)

(52) U.S. Cl.
CPC ............ *B64C 39/024* (2013.01); *B64C 25/36* (2013.01); *B64D 35/02* (2013.01); *B64D 47/08* (2013.01); *B64U 30/20* (2023.01); *B64U 50/19* (2023.01); *B64U 2101/00* (2023.01);
(Continued)

(58) Field of Classification Search
CPC ....... B64C 25/001; B64C 25/36; B64C 25/66; B64C 27/08; B64C 27/20; B64C 29/00; B64C 29/0091; B64C 39/00; B64C 39/02; B64C 39/022; B64C 39/024; B64C 2201/024; B64C 2201/12; B64C 2201/123; B64C 2201/127; B64D 45/04; B64D 45/06; B60F 5/02; A63H 27/12; A63H 33/005
See application file for complete search history.

(56) References Cited

U.S. PATENT DOCUMENTS

| | | | | |
|---|---|---|---|---|
| 4,505,346 | A * | 3/1985 | Mueller | ................. B62D 57/04 180/21 |
| 7,273,195 | B1 * | 9/2007 | Golliher | ................. A63H 27/12 244/17.11 |

(Continued)

FOREIGN PATENT DOCUMENTS

| | | |
|---|---|---|
| JP | 2016-120809 | 7/2016 |
| JP | 2017-039334 | 2/2017 |
| JP | 2017-124691 | 7/2017 |

*Primary Examiner* — Christopher D Hutchens
*Assistant Examiner* — Michael A. Fabula
(74) *Attorney, Agent, or Firm* — Fujitsu Patent Center (57) ABSTRACT

An aircraft includes: an aircraft body including rotating wings and motors that rotates the rotating wings; wheels arranged on both sides of the aircraft body and rotatably supported around an axis that extends in a left and right direction of the aircraft body; rollers that protrude forward and upward with respect to each of the wheels when the aircraft body is in a horizontal state, and are rotatably supported around an axis that extends in a tangential direction of each of the wheels; and a controller that controls a rotation speed of the motors such that, when the aircraft body is moved in the left and right direction along a vertical wall surface, the aircraft body is inclined forward to bring the rollers into contact with the vertical wall surface, and the aircraft body is inclined to a side where the aircraft body moves in the left and right direction.

6 Claims, 12 Drawing Sheets

(51) Int. Cl.
*B64U 30/20* (2023.01)
*B64U 50/19* (2023.01)
*B64U 101/00* (2023.01)
*B64U 101/30* (2023.01)
*B64U 101/60* (2023.01)

(52) U.S. Cl.
CPC ...... *B64U 2101/30* (2023.01); *B64U 2101/60* (2023.01); *B64U 2201/20* (2023.01)

(56) References Cited

U.S. PATENT DOCUMENTS

| | | | |
|---|---|---|---|
| 9,550,400 B2 * | 1/2017 | Hutson | B60F 5/02 |
| 9,688,400 B2 * | 6/2017 | Hutson | B60F 5/02 |
| 9,725,158 B2 * | 8/2017 | Yan | B64C 39/024 |
| 10,112,694 B2 * | 10/2018 | Yan | B64C 1/00 |
| 10,384,777 B1 * | 8/2019 | Welsh | B64F 3/02 |
| 10,676,331 B1 * | 6/2020 | Dorsey | B64C 39/024 |
| 11,077,935 B2 * | 8/2021 | Carrasco Zanini | B64C 1/061 |
| 2014/0131507 A1 * | 5/2014 | Kalantari | A63H 27/12 244/2 |
| 2014/0319266 A1 * | 10/2014 | Moschetta | B64C 39/024 244/13 |
| 2016/0009381 A1 * | 1/2016 | Benatar | B64C 39/024 244/103 R |
| 2016/0176514 A1 * | 6/2016 | Lavagen | A63H 23/14 244/50 |
| 2017/0050726 A1 * | 2/2017 | Yamada | B64C 25/54 |
| 2017/0209885 A1 * | 7/2017 | Neustadt | B05C 1/06 |
| 2017/0274995 A1 * | 9/2017 | Yamada | B64F 3/02 |
| 2017/0297681 A1 * | 10/2017 | Yamada | B64C 39/024 |
| 2018/0002035 A1 * | 1/2018 | Neely | H04N 13/296 |
| 2018/0074517 A1 * | 3/2018 | Yamada | G05D 1/101 |
| 2018/0208307 A1 * | 7/2018 | Boehme | A47L 11/36 |
| 2018/0251212 A1 * | 9/2018 | Sugaki | B64C 27/08 |
| 2019/0263206 A1 * | 8/2019 | Ricotti | B64C 39/024 |
| 2019/0329884 A1 * | 10/2019 | Hada | B64C 39/022 |
| 2020/0166938 A1 * | 5/2020 | Hafenrichter | B64C 39/024 |
| 2020/0283144 A1 * | 9/2020 | Andeweg | B64C 25/34 |
| 2021/0024212 A1 * | 1/2021 | Andeweg | B64C 39/024 |
| 2021/0147078 A1 * | 5/2021 | Kuroiwa | B64C 25/08 |
| 2021/0163122 A1 * | 6/2021 | Kawakami | B64C 39/024 |
| 2021/0237866 A1 * | 8/2021 | Groninga | B60L 50/53 |

\* cited by examiner

WALL SCALING UNMANNED AIRCRAFT AND METHOD OF CONTROLLING

CROSS-REFERENCE TO RELATED APPLICATION

This application is based upon and claims the benefit of priority of the prior Japanese Patent Application No. 2018-105237, filed on May 31, 2018, the entire contents of which are incorporated herein by reference.

FIELD

The embodiments disclosed herein are related to an aircraft and a method of controlling the aircraft.

BACKGROUND

In recent years, an aircraft that has a plurality of rotating wings, which is called a drone, is started to be used.

Related technologies are disclosed in, for example, Japanese Laid-open Patent Publication Nos. 2016-120809 and 2017-039334.

SUMMARY

According to one aspect of the embodiments, an aircraft includes: an aircraft body including a plurality of rotating wings and a plurality of motors that rotates the plurality of rotating wings; a pair of wheels arranged on both sides of the aircraft body and rotatably supported by the aircraft body around an axis that extends in a left and right direction of the aircraft body; a pair of rollers that protrude forward and upward with respect to each of the wheels when the aircraft body is in a horizontal state, and are rotatably supported by the aircraft body around an axis that extends in a tangential direction of each of the wheels; and a controller that controls a rotation speed of the plurality of motors such that, when the aircraft body is moved in the left and right direction along a vertical wall surface, the aircraft body is inclined forward to bring the pair of rollers into contact with the vertical wall surface, and the aircraft body is inclined to a side where the aircraft body moves in the left and right direction.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

For example, as for such an aircraft, an aircraft may be proposed that includes a pair of wheels provided on both of the left and right sides of the plurality of rotating wings, and moves on a vertical wall surface by causing the pair of wheels to be brought into contact with the vertical wall surface.

However, a pair of wheels are rotatably supported around an axis that extends in a left and right direction in the aircraft. Therefore, it is difficult to move the aircraft in the left and right direction in a state where the pair of wheels are brought into contact with a vertical wall surface.

The technology disclosed herein has been made in consideration of the circumstances. As, one aspect, the technology disclosed herein is to provide an aircraft capable of moving in the left and right direction while being brought into contact with a vertical wall surface.

In the following, an embodiment of the technology disclosed herein will be described.

As illustrated in FIGS. 1 to 4, an aircraft according to the embodiment includes an aircraft body 12 and a pair of wheels 50. The arrows FR, UP, and RH illustrated in the each drawing indicate a front side in the front and rear direction of the aircraft 10, an upper side in the vertical direction of the aircraft 10, and a right side in the left and right direction of the aircraft 10, respectively.

The aircraft body 12 includes a frame 20, a plurality of rotating wings 40A to 40D, a plurality of motors 41A to 41D, and a pair of rollers 42. The frame 20 forms a skeleton of the aircraft body 12 and includes an inner frame 21 and an outer frame 31. The inner frame 21 is an example of a "first frame portion," and has a frame shape when viewed from the top. The inner frame 21 includes a pair of front and rear connecting members 22 that extend in the front and rear direction of the aircraft 10, and a pair of left and right connecting members 23 that extend in the left and right direction of the aircraft 10.

Both left and right ends of the pair of left and right connecting members 23 are coupled to the pair of front and rear connecting members 22. The pair of left and right connecting members 23 intersect with the pair of front and rear connecting members 22 at connecting portions with the pair of front and rear connecting members 22. The connecting portions between the pair of left and right connecting members 23 and the pair of front and rear connecting members 22 correspond to intersecting portions 24A to 24D. A total of four intersecting portions 24A to 24D are formed on the inner frame 21. The plurality of intersecting portions 24A to 24D are arranged at the front, the rear, the left, and the right of the aircraft 10.

The outer frame 31 includes a plurality of connecting rods 32A to 32F that extend in the left and right direction of the aircraft 10, a pair of annular members 33 arranged on both left and right sides of the plurality of connecting rods 32A to 32F, and a plurality of spokes 34A to 34F provided inside of the pair of annular members 33. The pair of annular members 33 form an annular shape around an axis L1 that extends in the left and right direction of the aircraft body 12, and the plurality of spokes 34A to 34F are radially formed around a center portion of the annular member 33. Distal ends of the plurality of spokes 34A to 34F are coupled to the annular member 33. Further, distal ends of the plurality of spokes 34A to 34F on the left side and distal ends of the plurality of spokes 34A to 34F on the right side are coupled by the plurality of connecting rods 32A to 32F, respectively.

The outer frame 31 includes an outer frame portion 35 having a rectangular frame shape that surrounds the inner frame 21 when viewed from the top. The outer frame portion 35 includes a plurality of spokes 34A and 34B that extends in the front and rear direction of the aircraft 10 among the plurality of spokes 34A to 34F on both of the left and right sides, and a front side connecting rod 32A and a rear side connecting rod 32B that are coupled to the plurality of spokes 34A and 34B. The outer frame portion 35 is an example of a "second frame portion." Front ends of the pair of front and rear connecting members 22 are coupled to the front side connecting rod 32A, and rear ends of the pair of front and rear connecting members 22 are coupled to the rear side connecting rod 32B.

Further, the outer frame 31 is provided with a support rod 36 that extends in the left and right direction of the aircraft 10 and a rotating member 37 that is rotatably supported by the support rod 36. The support rod 36 is arranged above the center portion (a center portion of the plurality of spokes 34A to 34F) of the pair of annular members 33. The support rod 36 is arranged between a pair of spokes 34C and 34D at an upper side among the plurality of spokes 34A to 34F, and is fixed to the pair of spokes 34C and 34D at the upper side. Both ends of the support rod 36 penetrate the pair of annular members 33, and protrude to both of the left and right sides of the aircraft 10 more than the pair of annular members 33.

The rotating member 37 is formed in a rectangular arch shape having a pair of lateral rods 38 and a central rod 39 that connects the distal ends of the pair of lateral rods 38. The pair of lateral rods 38 are arranged on both of the left and right sides of the aircraft 10 beyond the pair of annular members 33, and extend in the diametric direction of the pair of annular members 33.

The base ends of the pair of lateral rods 38 are turnably coupled to the both ends of the support rods 36, respectively. The pair of lateral rods 38 are formed to have a length such that the central rod 39 is able to circulate around the outside in the diametric direction of the pair of annular members 33. The central rod 39 is connected with for example, a cable for power supply and signal transmission/receiving, or a wire for preventing the aircraft 10 from dropping or limiting the moving range of the aircraft 10.

The plurality of rotating wings 40A to 40D are arranged at the four intersecting portions 24A to 24D described above for each in two rows vertically. For example, the rotating wings 40A at the right front side are arranged vertically at the intersecting portion 24A at right front side, and the rotating wings 40B at the left front side are arranged vertically at the intersecting portion 24B at the left front side. Further, the rotating wings 40C at the right rear side are arranged vertically at the intersecting portion 24C at the right rear side, and the rotating wings 40D at the left rear side are arranged vertically at the intersecting portion 24D at the left rear side.

In this manner, the plurality of rotating wings 40A to 40D are arranged at the four intersecting portions 24A to 24D in two rows vertically, so that the rotating wings 40A at the right front side, the rotating wings 40B at the left front side, the rotating wings 40C at the right rear side, and the rotating wings 40D at the left rear side are arranged at the front and rear, and the left and right of the aircraft 10. All of the plurality of rotating wings 40A to 40D are arranged with the vertical direction of the aircraft 10 as the axial direction.

Hereinafter, the rotating wings 40A at the light front side and the rotating wings 40B at the left front side may be referred to as "front side rotating wings 40A and 40B," and the rotating wings 40C at the right rear side and the rotating wings 40D at the left rear side may be referred to as "rear side rotating wings 40C and 40D." The rotating wings 40A at the right front side and the rotating wings 40C at the right rear side may be referred to as "right side rotating wings 40A and 40C," and the rotating wings 40B at the left front side and the rotating wings 40D at the left rear side may be referred to as "left side rotating wings 40B and 40D." The front side rotating wings 40A and 40B and the rear side rotating wings 40C and 40D are arranged symmetrically in the front and rear direction, and the right side rotating wings 40A and 40C and the left side rotating wings 40B and 40D are arranged symmetrically in the left and right direction.

The plurality of motors 41A to 41D are fixed at the four intersecting portions 24A to 24D described above for each in two rows vertically. All of the plurality of motors 41A to 41D are arranged with the vertical direction of the aircraft 10 as the axial direction. The plurality of rotating wings 40A to 40D described above are fixed to output shafts of the plurality of motors 41A to 41D, respectively. The plurality of motors 41A to 41D rotate the plurality of rotating wings 40A to 40D, respectively. The plurality of motors 41A to 41D are able to independently adjust the rotation speed of the plurality of rotating wings 40A to 40D.

The rotating wings 40A at the right front side and the left rear side rotating wings 40D at the left rear side rotate in a same direction, and the rotating wings 40B at the left front side and the rotating wings 40C at the right rear side rotate in a direction opposite to the rotating direction of the rotating wings 40A at the right front side and the rotating wings 40D at the left rear side. For example, the rotating wings that are adjacent to each other in the front and rear direction or the left and right direction of the aircraft among the plurality of rotating wings 40A to 40D rotate in different directions.

The pair of wheels 50 are rotatably supported by the annular members 33 over the entire circumference, respectively. The pair of wheels 50 are supported by the annular members 33, so that the wheels 50 are arranged on both of the left and right sides of the aircraft body 12, and are rotatable around the axis L1 that extends in the left and right direction of the aircraft body 12. The pair of wheels 50 are arranged on both of the left and right sides of the plurality of rotating wings 40A to 40D. Further, the front ends of the pair of wheels 50 are positioned at the front of the plurality of rotating wings 40A to 40F when viewed from a side surface of the aircraft 10.

Support members 43 configured to rotatably support the pair of rollers 42 are provided at the pair of annular members 33 that rotatably support the wheels 50, respectively. Each of the support members 43 has a rotation shaft that extends in a tangential direction of each of the wheels 50. The tangential direction of the wheel 50 that is an axial direction of the rotation shaft 44 is in a twisted position with respect to the axial direction of the wheel 50. The tangential direction of the wheel 50 does not necessarily coincide with a tangent of an outer peripheral surface of the wheel 50, and may be parallel with the tangent of the outer peripheral surface of each of the wheels 50.

The pair of rollers 42 are rotatably supported by each of the rotation shafts 44. The pair of rollers 42 are supported by each of the rotation shafts 44 so as to be rotatable around the axis L2 that extends in the tangential direction of each of the wheels 50. Further, the pair of rollers 42 are arranged at positions where the rollers 42 protrude forward and upward with respect to each of the wheels 50 when the aircraft body 12 is in a horizontal state. As an example, the roller 42 is formed in an elliptical spherical shape whose major axial direction is the axial direction of the rotation shaft 44. A contact surface 42A (outer peripheral surface) of the roller 42 with the vertical wall surface forms a convex curved surface shape when viewed from the side surface of the aircraft body 12 (aircraft 10).

In the embodiment, as an example, the pair of rollers 42 and the pair of wheels 50 are supported by the annular members 33 provided at the aircraft body 12. Therefore, as described later, when the aircraft body 12 is inclined to a side where the aircraft body 12 moves in the left and right direction, the pair of rollers 42 and the pair of wheels 50 are inclined together with the aircraft body 12 in order to move the aircraft 10 in the left and right direction. In this manner, in the embodiment, since the pair of rollers 42 and the pair of wheels 50 are inclined together with the aircraft body 12, the inclination of the aircraft body 12 to the side where the aircraft body 12 moves in the left and right direction is synonymous with the inclination of the aircraft 10 to the side where the aircraft 10 moves in the left and right direction.

Figure 5:
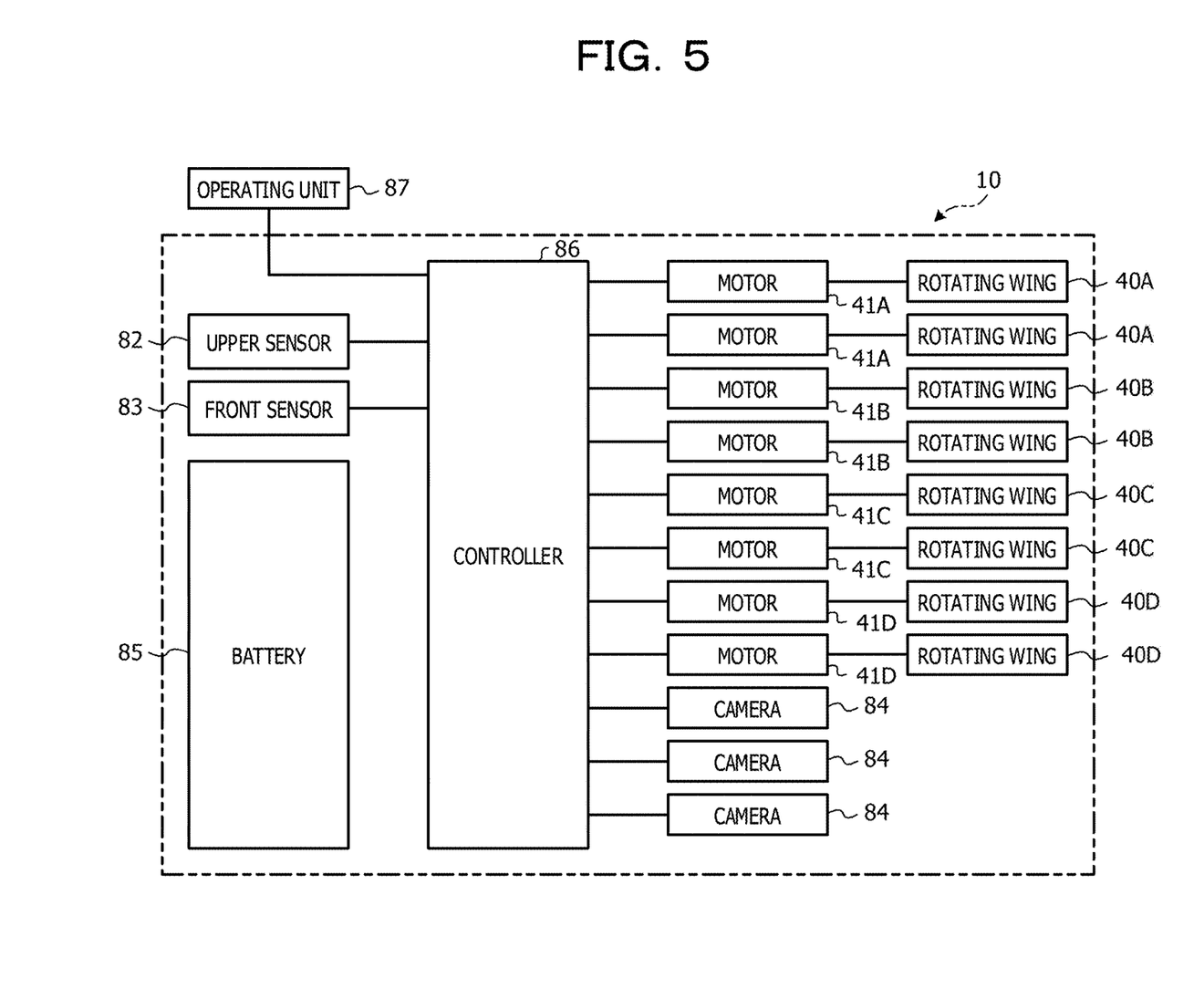
FIG. 5 is a block view illustrating a configuration of the aircraft of FIG. 1.

Further, as illustrated in FIG. 5, the aircraft 10 according to the embodiment includes an upper sensor 82, a front sensor 83, a plurality of cameras 84, a battery 85, and a controller 86.

The upper sensor 82 is for detecting an object positioned above the aircraft 10, and the front sensor 83 is for detecting an object positioned in front of the aircraft 10. The upper sensor 82 is arranged facing upward of the aircraft 10, and the front sensor 83 is arranged facing the front of the aircraft 10. Various types of sensors may be applied to the upper sensor 82 and the front sensor 83.

The plurality of cameras 84 are for photographing the front of the aircraft 10, and are arranged to face the front of the aircraft 10 at both of the left and right sides of the aircraft 10. As an example, the plurality of cameras 84 are respectively fixed to the center portion and both ends of the support rod 36 (see, e.g., FIG. 1).

The controller 86, an operating unit 87, and the battery 85 are only illustrated in FIG. 5. The controller 86 is realized by, for example, an electronic circuit (computer) including, for example, a calculation unit and a storage unit. The controller 86 is electrically coupled to the upper sensor 82, the front sensor 83, the plurality of cameras 84, and the plurality of motors 41A to 41D (flying motors). Further, the controller 86 is coupled to the operating unit 87 so as to receive an operation signal. The operation of the controller 86 will be described later.

The battery 85 is configured to supply power to the upper sensor 82, the front sensor 83, the plurality of cameras 84, the plurality of motors 41A to 41D, and the controller 86 described above. The controller 86 and the battery 85 may be mounted on the frame 20, and also, may be mounted on an operating device provided near an operator. When the controller and the battery 85 are mounted on the operating device provided near the operator, the controller 86 and the battery 85 are electrically connected to a relay board mounted on the frame 20 via, for example, a cable or the like.

Subsequently, an example of a method for using the aircraft 10 of the embodiment and a method of controlling the aircraft 10 will be described.

Figure 1:
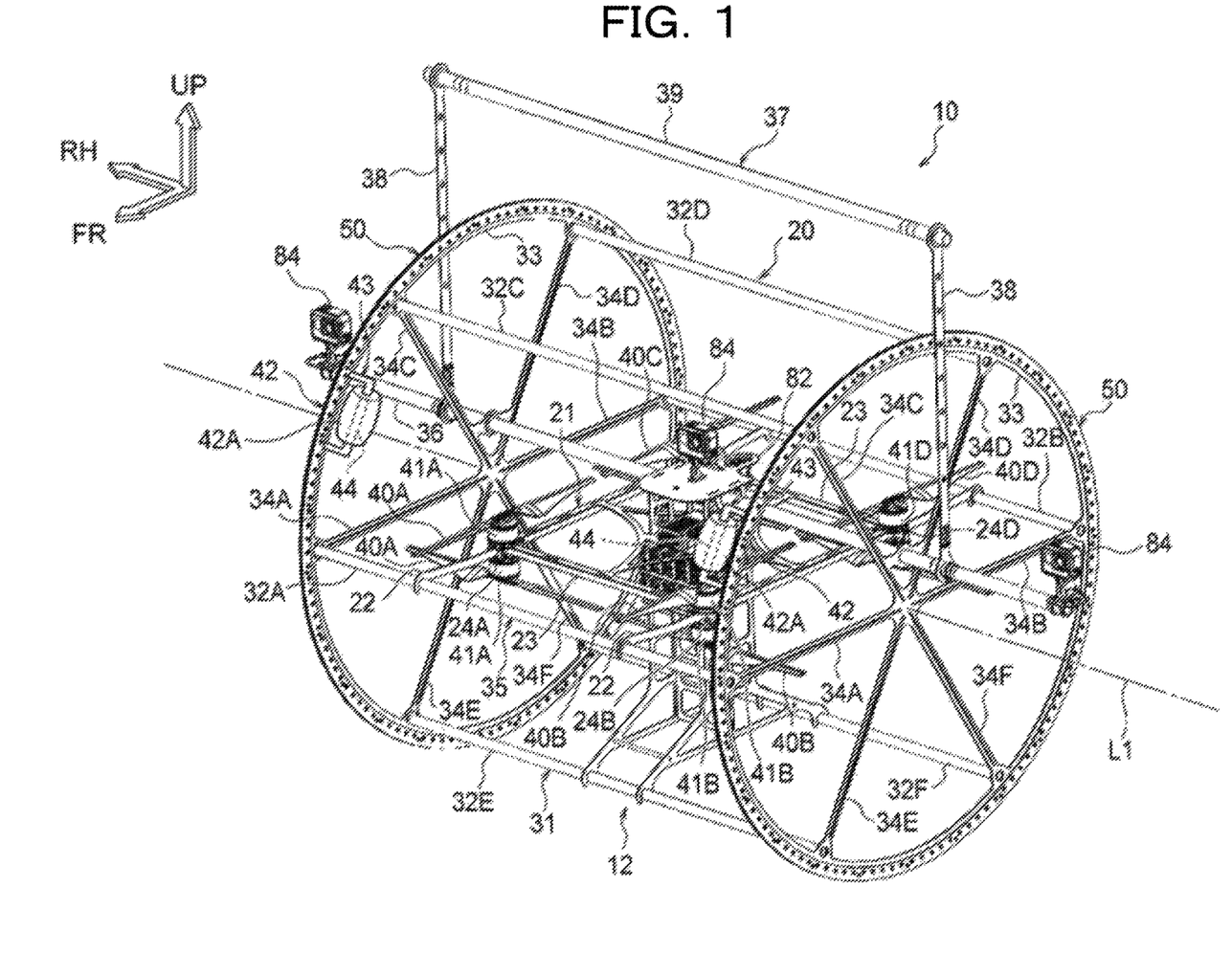
FIG. 1 is a perspective view of an aircraft according to an embodiment.
Figure 2:
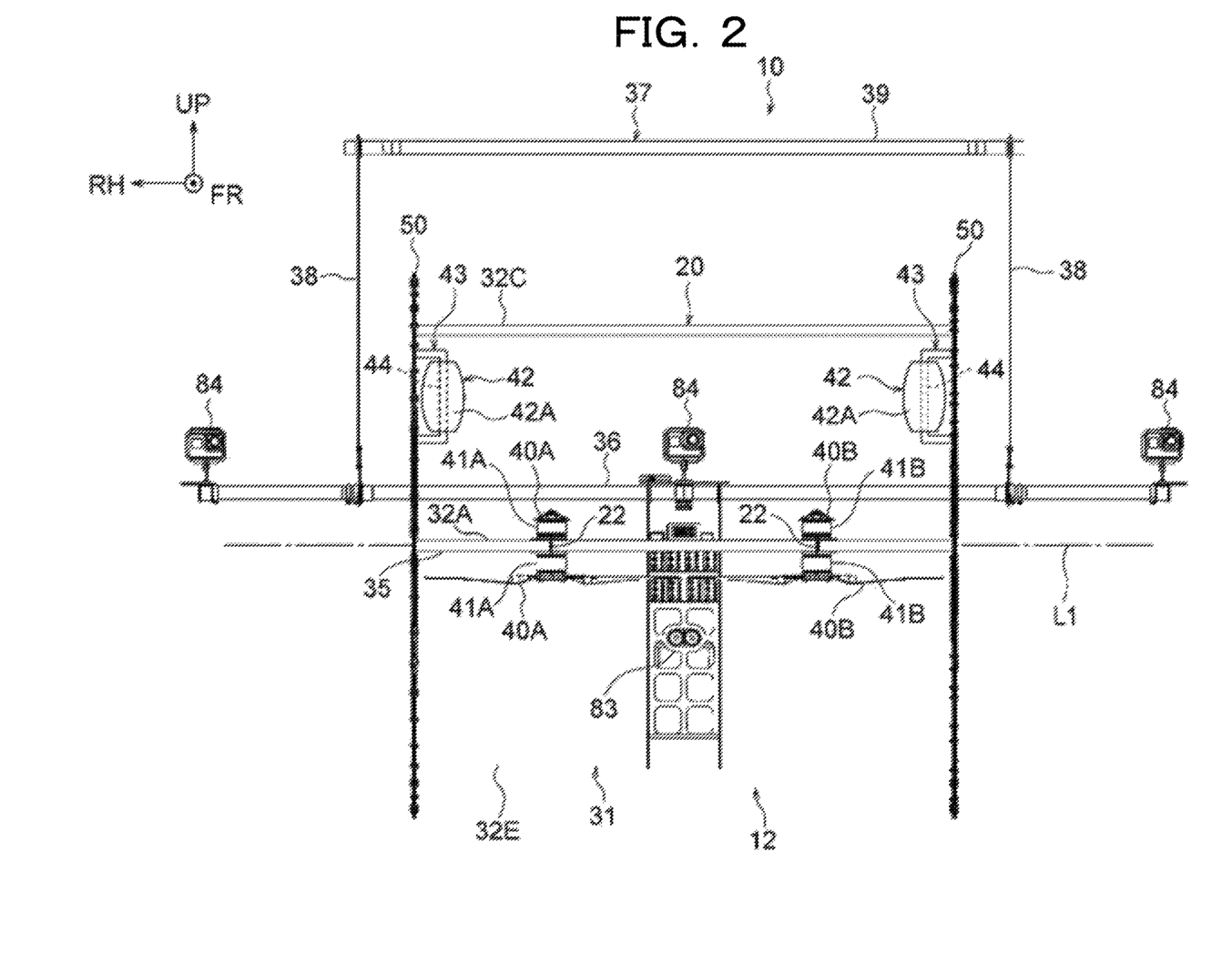
FIG. 2 is a front view of the aircraft of FIG. 1.
Figure 3:
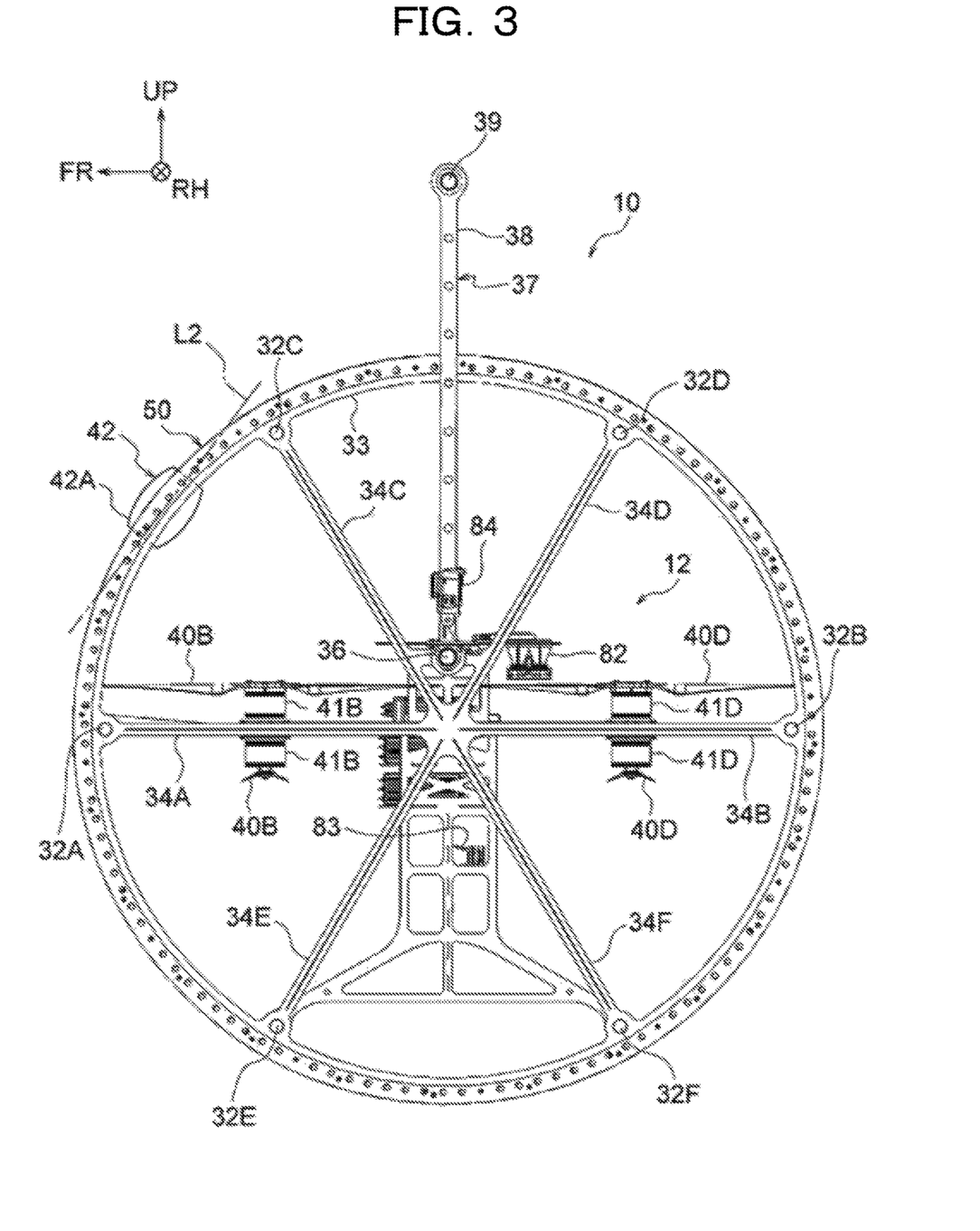
FIG. 3 is a left side view of the aircraft of FIG. 1.
Figure 4:
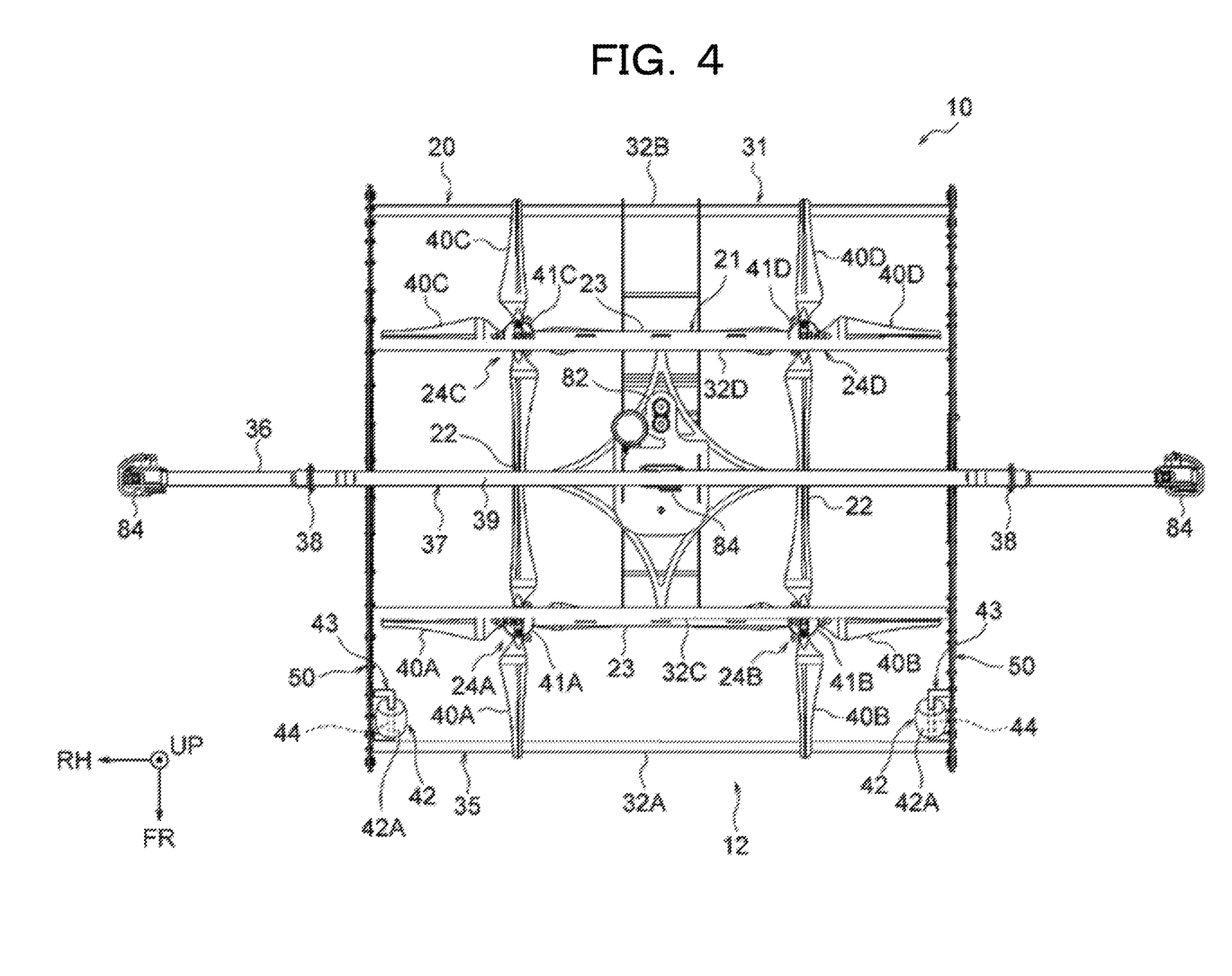
FIG. 4 is a top view of the aircraft of FIG. 1.
Figure 6:
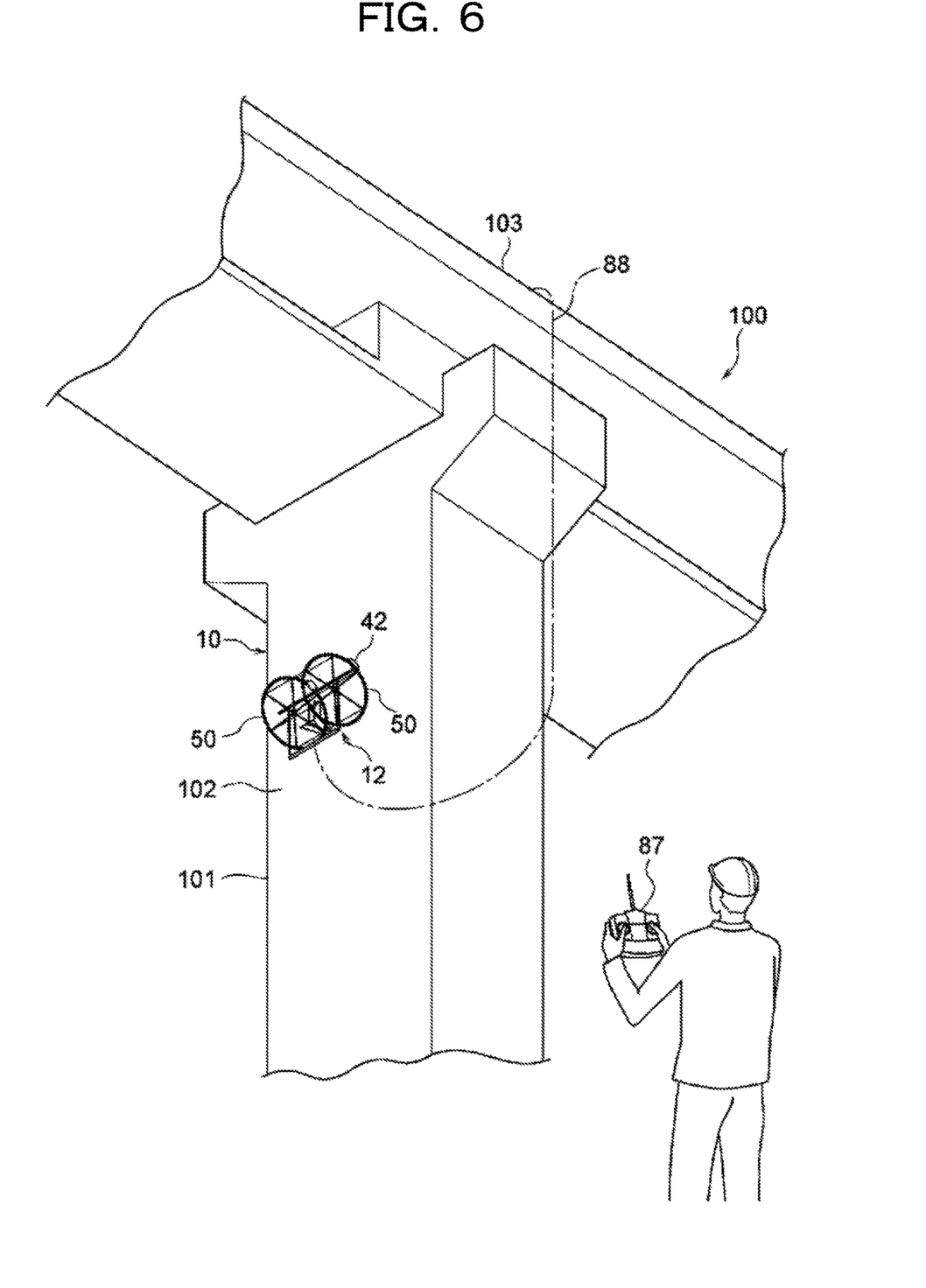
FIG. 6 is a view illustrating an example of a method for using the aircraft of FIG. 1.

An example of the method for using the aircraft 10 of FIG. 1 is illustrated in FIG. 6. In the following description, reference will be appropriately made on FIGS. 1 to 5 for the detailed structure of the aircraft 10, since the detailed structure of the aircraft 10 is not illustrated in FIG. 6.

As illustrated in FIG. 6, in the method of using the aircraft 10 according to the embodiment, as an example, the aircraft 10 flies toward a vertical wall surface 102 of a bridge pier 101 provided at a bridge 100 and the pair of wheels 50 are brought into contact with the vertical wall surface 102 and the aircraft 10 moves on the vertical wall surface 102. In the embodiment, as an example, the controller 86 and the battery 85 are disposed on a bridge girder 103, and the controller 86 and the battery 85 are coupled with the aircraft body 12 via a cable 88. The aircraft 10 flies according to the operation of the operating unit 87 by the operator. When the aircraft 10 moves on the vertical wall surface 102, for example, the vertical wall surface 102 is photographed by the plurality of cameras 84.

Subsequently, the method of controlling the aircraft 10 according to the embodiment will be described. When the aircraft 10 flies toward the vertical wall surface 102, and the pair of wheels 50 are brought into contact with the vertical wall surface 102, the controller 86 detects that the pair of wheels 50 are brought into contact with the vertical wall surface 102 based on, for example, the detecting results of a contact sensor or the front sensor provided at the aircraft body 12. Then, the controller 86 performs processings of steps S1 to S5 illustrated in FIG. 7 when it is detected that the pair of wheels 50 are brought into contact with the vertical wall surface 102.

Figure 7:
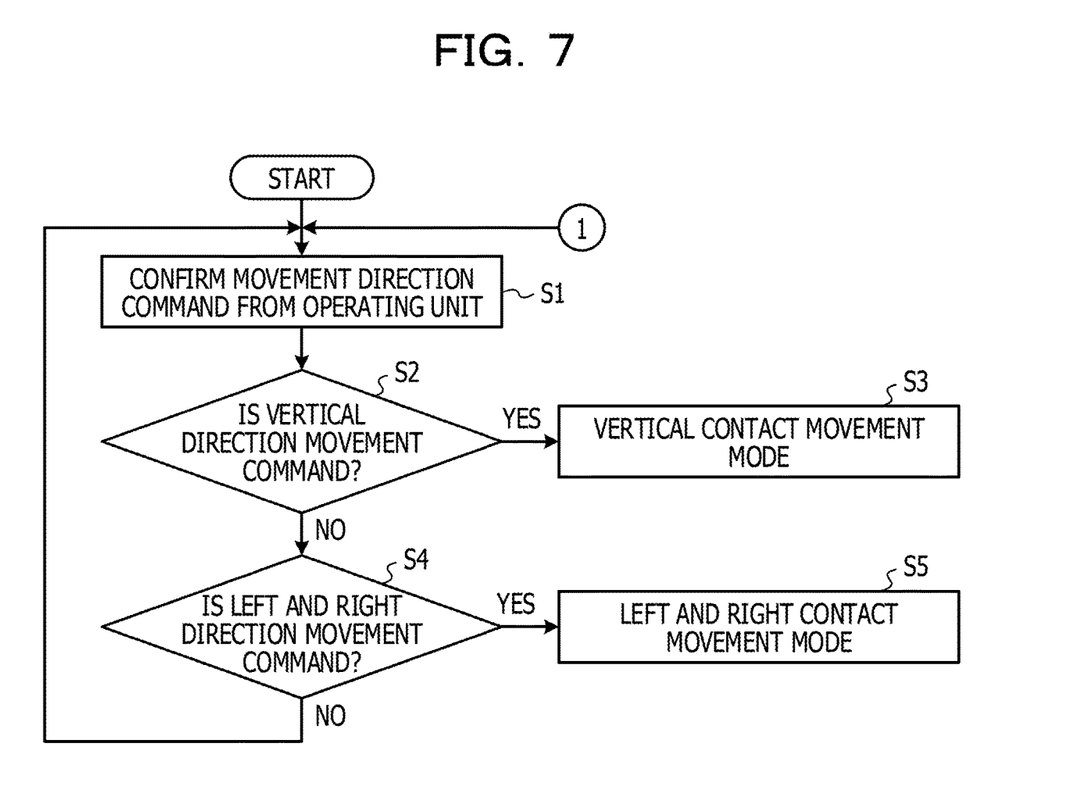
FIG. 7 is a view illustrating a flow of processing in mode switching in a controller applied to the aircraft of FIG. 1.

In step S1, the controller 86 confirms a movement command from the operating unit 87. Then, the controller 86 determines whether the movement command from the operating unit 87 is a vertical direction movement command in step S2. Here, when it is determined that the movement command from the operating unit 87 is the vertical direction movement command, the controller 86 proceeds with step S3.

Figure 9:
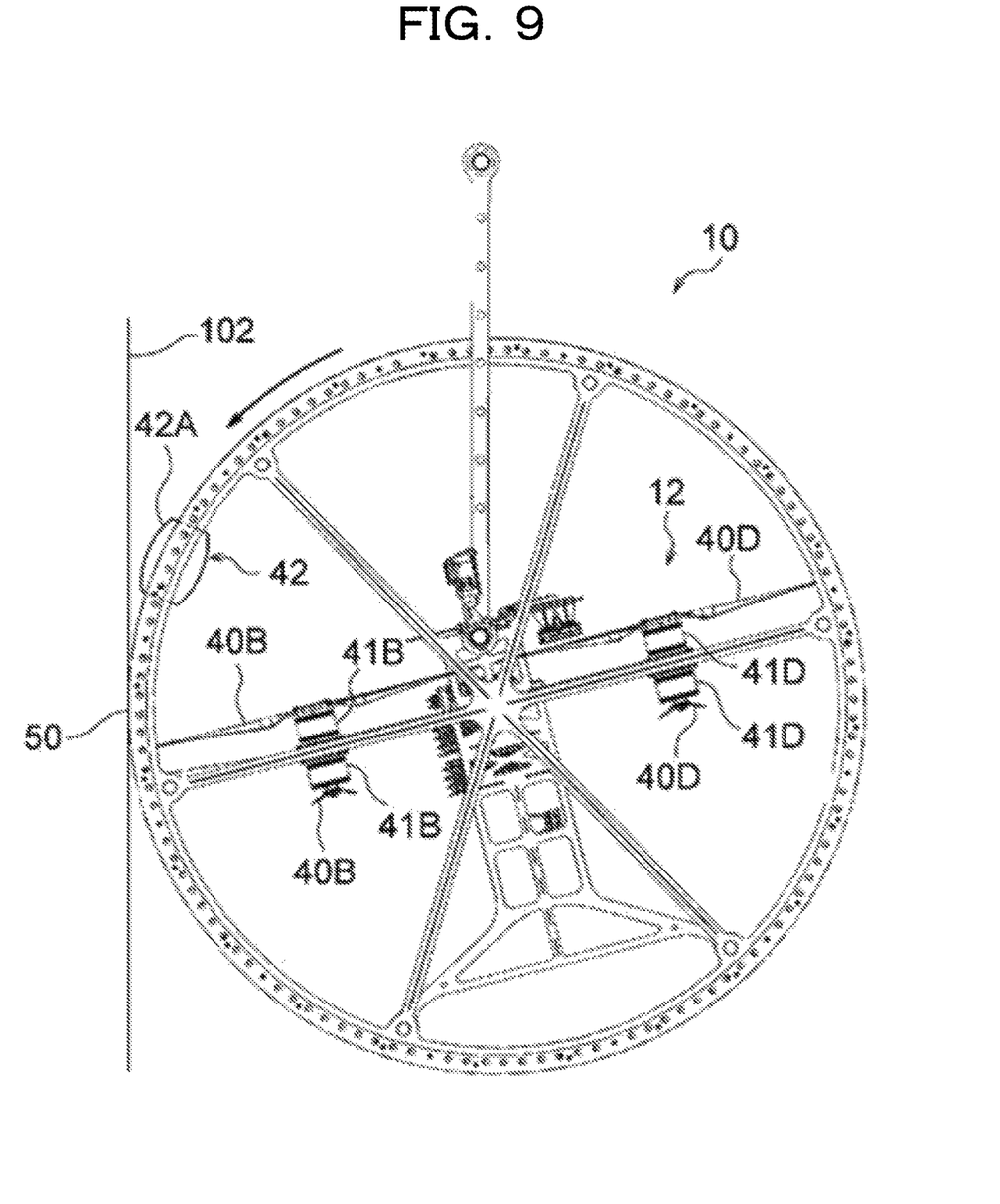
FIG. 9 is a left side view illustrating a state where an aircraft body is inclined forward to an extent that a pair of rollers are not brought into contact with a vertical wall surface in a method of controlling the aircraft of FIG. 1.

In step S3, the controller 86 enters a "vertical contact movement mode." Then, as illustrated in FIG. 9, the controller 86 controls the rotation speed of the plurality of motors 41A to 41D so that the aircraft body 12 is in a forward inclined posture such that the pair of rollers 42 are not brought into contact with the vertical wall surface 102. At this time, the controller 86 controls the rotation speed of the plurality of motors 41A to 41D such that the rotation speed of the rear side motors 41C and 41D among the plurality of motors 41A to 41D is higher than that of the front side motors 41A and 41B. In this manner, when the aircraft body 12 is in the forward inclined posture such that the pair of rollers 42 are not brought into contact with the vertical wall surface 102, pressing force to the vertical wall surface 102 acts on the pair of wheels 50.

Further, the controller 86 controls the rotation speed of the plurality of motors 41A to 41D such that the aircraft body 12 is moved in the vertical direction based on the vertical direction movement command from the operating unit 87 while the aircraft body 12 maintains the forward inclined posture. In this manner, when the aircraft body 12 moves in the vertical direction, the pair of wheels 50 run on the vertical wall surface 102, and thus, the vertical direction movement of the aircraft body 12 is stabilized.

Meanwhile, when it is determined that the movement command from the operating unit 87 is not the vertical direction movement command, the controller 86 proceeds with step S4. The controller 86 determines whether the movement command from the operating unit 87 is a left and right direction movement command in step S4. Here, when it is determined that the movement command from the operating unit 87 is not the left and right direction movement command, the controller 86 returns to step S1. Meanwhile, when it is determined that the movement command from the operating unit 87 is the left and right direction movement command, the controller 86 proceeds with step S5. After proceeding with step S5, the controller 86 enters a "left and right contact movement mode," and performs processings of steps S11 to S19 illustrated in FIG. 8.

Figure 8:
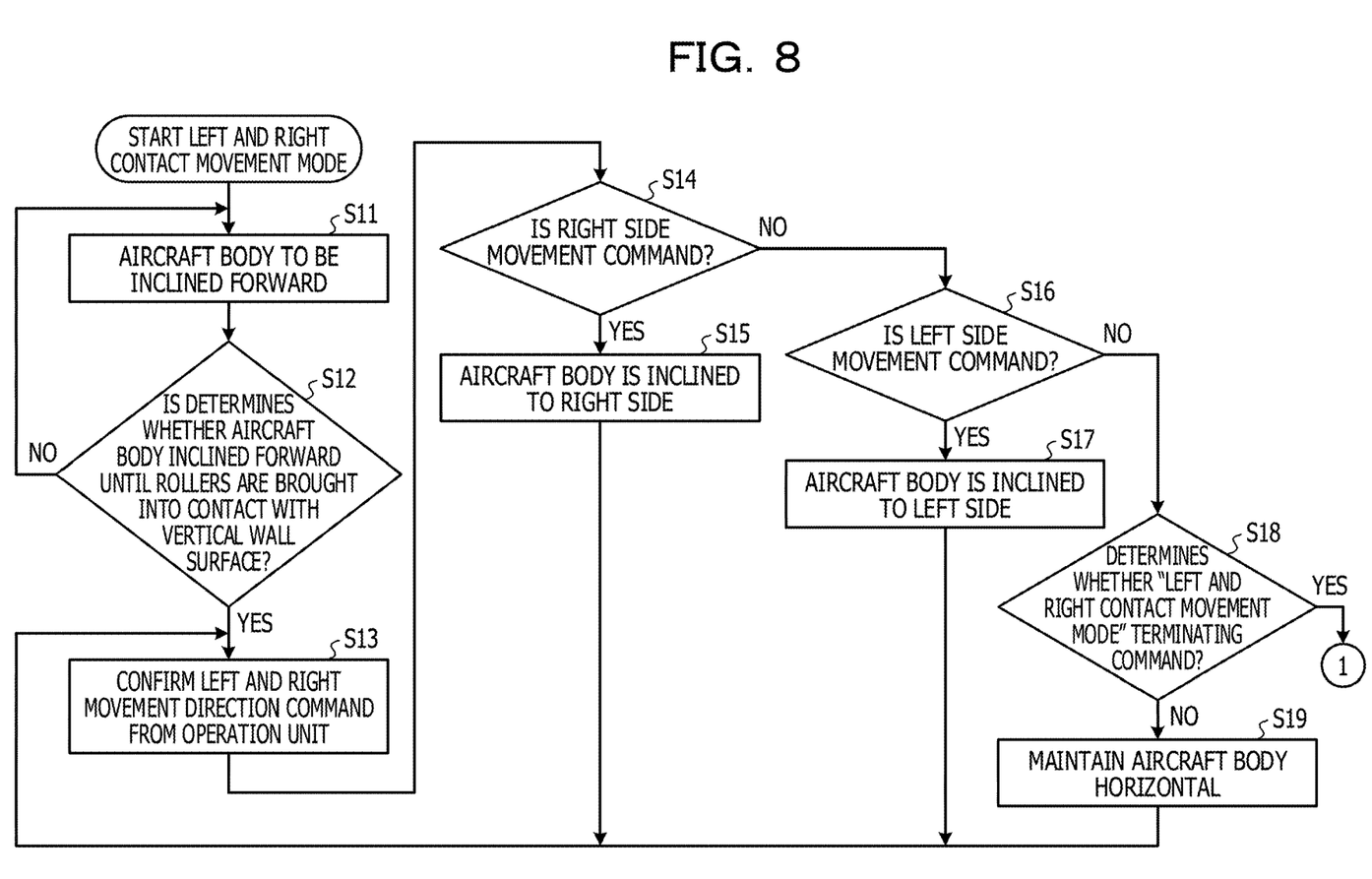
FIG. 8 is a view illustrating a flow of processing in a left and right contact movement mode in the controller applied to the aircraft of FIG. 1.

In step S11, the controller 86 controls the rotation speed of the plurality of motors 41A to 41D so as to bring the pair of rollers 42 into contact with the vertical wall surface 102, thereby causing the aircraft body 12 to be inclined forward.

Figure 10:
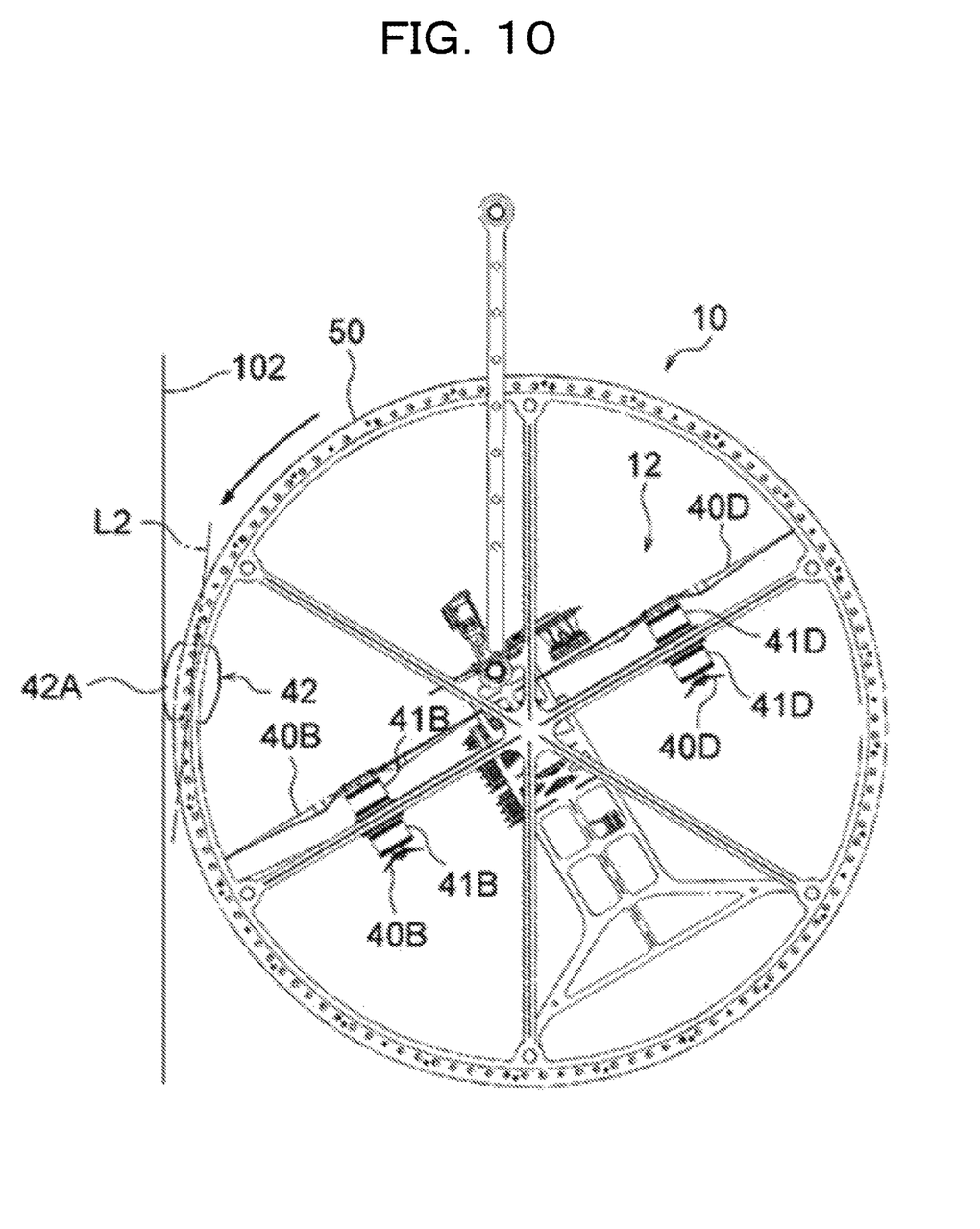
FIG. 10 is a left side view illustrating a state where the aircraft body is inclined forward to an extent that the pair of rollers are brought into contact with the vertical wall surface in the method of controlling the aircraft of FIG. 1.

In step S12, the controller 86 determines whether the aircraft body 12 is inclined forward until the pair of rollers 42 are brought into contact with the vertical wall surface 102. At this time, the controller 86 determines whether the aircraft body 12 is inclined forward until the pair of rollers 42 are brought into contact with the vertical wall surface 102 based on, for example, the detecting results of a sensor that detects that the pair of rollers 42 are brought into contact with the vertical wall surface 102, a sensor that detects the forward inclination angle of the aircraft body 12 or the like. Then, as illustrated in FIG. 10, when the aircraft body 12 is inclined forward until the pair of rollers 42 are brought into contact with the vertical wall surface 102, the controller 86 determines that the aircraft body 12 is inclined forward until the pair of rollers 42 are brought into contact with the vertical wall surface 102, and the controller 86 proceeds with step S13. More specifically, the controller 86 causes the aircraft body 12 to be inclined forward until the pair of rollers 42 that protrude with respect to each of the wheels 50 are brought into contact with the vertical wall surface 102 and each of the wheels 50 is separated from the vertical wall surface 102.

Figure 11:
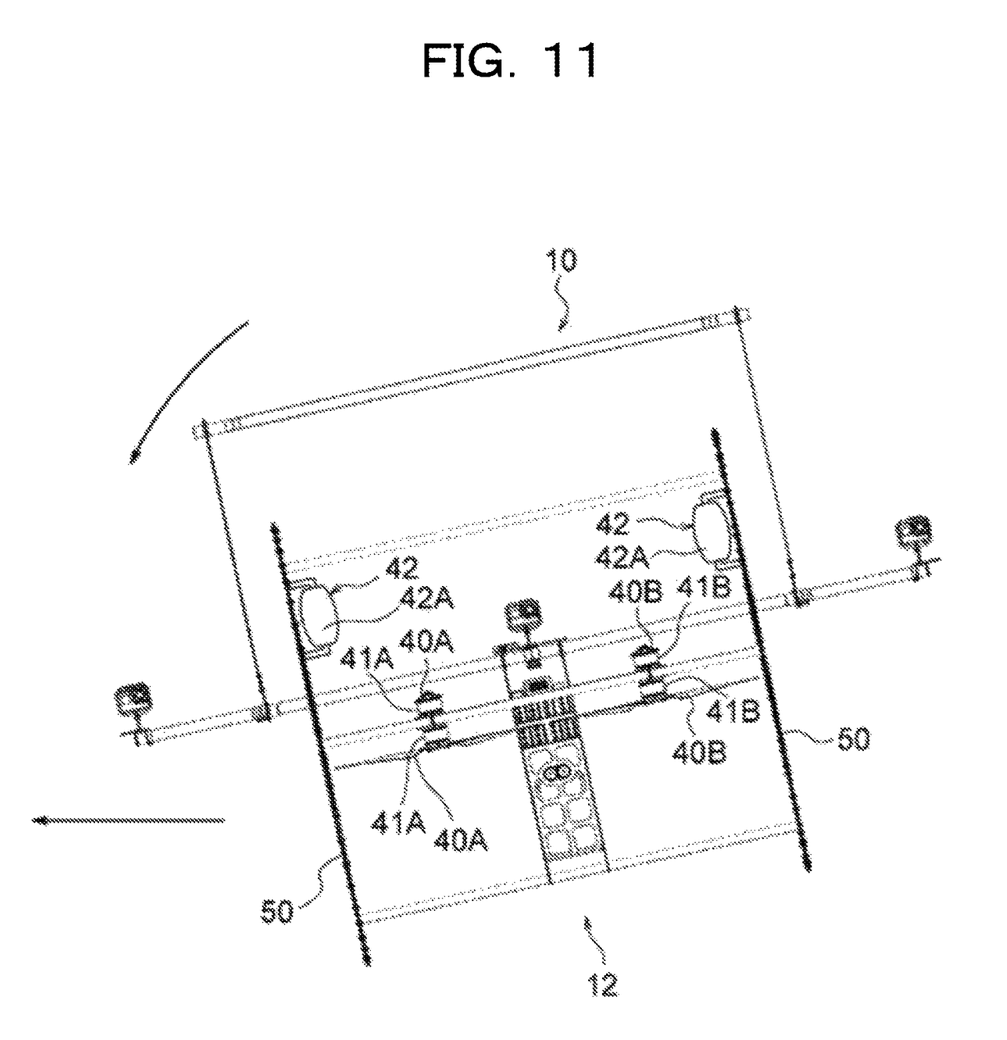
FIG. 11 is a front view illustrating a state where the aircraft body is inclined to the right side in the method of controlling the aircraft of FIG. 1.

In step S13, the controller 86 confirms a left and right movement command from the operating unit 87. Then, in step S14, the controller 86 determines whether the left and right movement command from the operating unit 87 is a right side movement command. Here, when it is determined that the left and right movement command from the operating unit 87 is the right side movement command, the controller 86 proceeds with step S15. Then, in step S15, the controller 86 controls the rotation speed of the plurality of motors 41A to 41D to cause the aircraft body 12 to be inclined to the right side where the aircraft body 12 moves in the left and right direction, as illustrated in FIG. 11. At this time, the controller 86 controls the rotation speed of the plurality of motors 41A to 41D such that the rotation speed of the left side motors 41B and 41D among the plurality of motors 41A to 41D is higher than that of the right side motors 41A and 41C. In this manner, when the aircraft body 12 is inclined to the right side, the aircraft body 12 moves to the right side. In this manner, when the aircraft body 12 moves to the right side, the pair of rollers 42 run on the vertical wall surface 102, and thus, the right side movement of the aircraft body 12 is stabilized.

Figure 12:
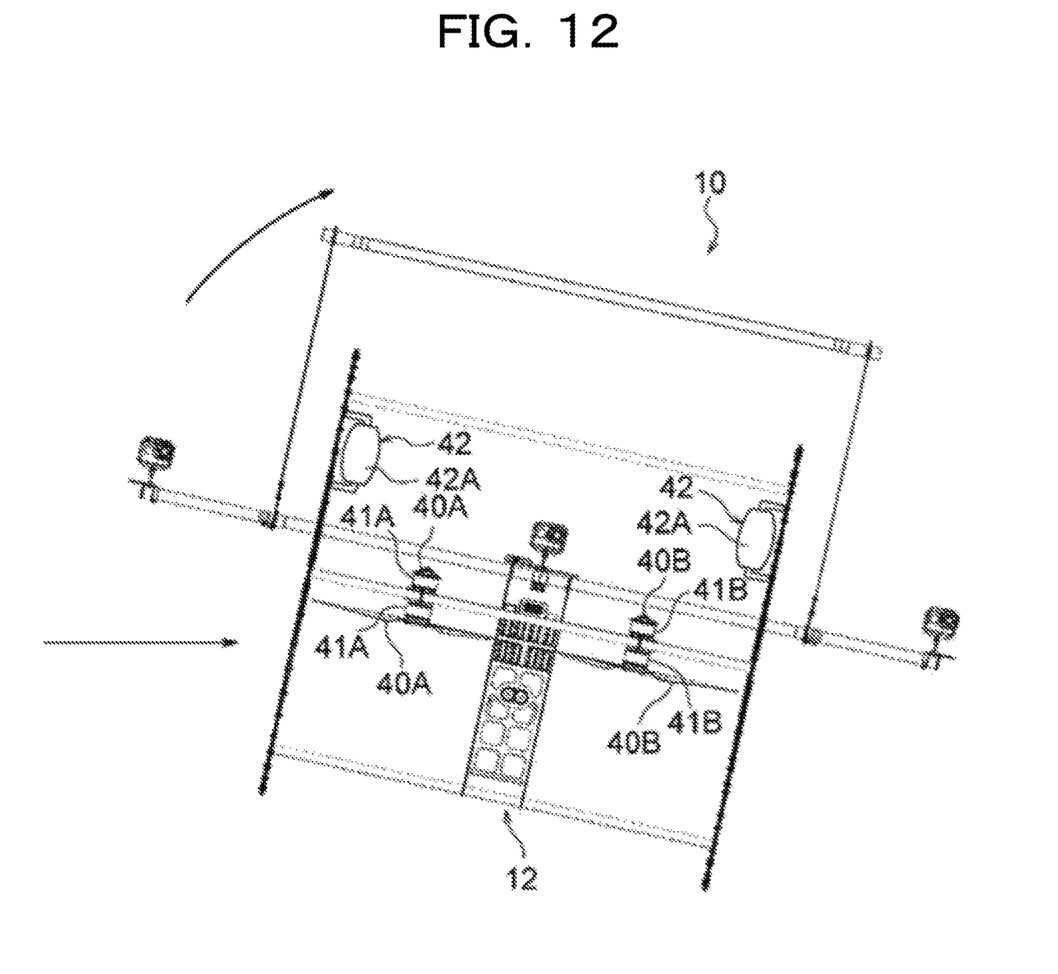
FIG. 12 is a front view illustrating a state where the aircraft body is inclined to the left side in the method of controlling the aircraft of FIG. 1.

Meanwhile, when it is determined that the left and right movement command from the operating unit 87 is not the right side movement command, the controller 86 proceeds with step S16. Then, in step S16, the controller 86 determines whether the left and right movement command from the operating unit 87 is a left side movement command. Here, when it is determined that the left and right movement command from the operating unit 87 is the left side movement command, the controller 86 proceeds with on step S17. Then, in step S17, the controller 86 controls the rotation speed of the plurality of motors 41A to 41D to cause the aircraft body 12 to be inclined to the left side where the aircraft body 12 moves in the left and right direction, as illustrated in FIG. 12. At this time, the controller 86 controls the rotation speed of the plurality of motors 41A to 41D such that the rotation speed of the right side motors 41A and 41C among the plurality of motors 41A to 41D is higher than that of the left side motors 41B and 41D. In this manner, when the aircraft body 12 is inclined to the left side, the aircraft body 12 moves to the left side. In this manner, when the aircraft body 12 moves to the left side, the pair of rollers 42 run on the vertical wall surface 102, and thus, the left side movement of the aircraft body 12 is stabilized.

When it is determined that the left and right movement command from the operating unit 87 is not the left side movement command, the controller 86 proceeds with step S18. Then, in step S18, the controller 86 determines whether a "left and right contact movement mode" terminating command is received from the operating unit 87. Here, when it is determined that "the left and right contact movement mode" terminating command is received from the operating unit 87, the controller 86 returns to step S1. Meanwhile, when it is determined that the "left and right contact movement mode" terminating command is not received from the operating unit 87, the controller 86 proceeds with step S19. Then, in step S19, the controller 86 controls the rotation speed of the plurality of motors 41A to 41D to maintain the aircraft body 12 horizontal. Then, the controller 86 returns to step S13.

Subsequently, the operation and the effect of the embodiment will be described.

As described above, according to the embodiment, the pair of rollers 42 rotatable around the axis L2 that extend in the tangential direction of each of the wheels 50 are supported at the aircraft body 12. The pair of rollers 42 protrude forward and upward with respect to each of the wheels 50 when the aircraft body 12 is in the horizontal state. Then, when the aircraft body 12 is moved in the left and right direction along the vertical wall surface 102, the aircraft body 12 is inclined forward so that the pair of rollers 42 are brought into contact with the vertical wall surface 102. Further, the rotation speed of the plurality of motors 41A to 41F is controlled such that the aircraft body 12 is inclined to a side where the aircraft body 12 moves in the left and right direction. Therefore, when the aircraft body 12 is moved in the left and right direction along the vertical wall surface 102, the pair of rollers 42 run on the vertical wall surface 102, so that the aircraft 10 may be moved in the left and right direction while the aircraft 10 is brought into contact with the vertical wall surface 102.

Further, when the aircraft body 12 moves in the left and right direction as described above, the pair of rollers 42 arranged on both of the left and right sides of the aircraft body 12 run on the vertical wall surface 102. Therefore, the left and right direction movement of the aircraft 10 may be stabilized.

Further, the contact surface 42A of the roller 42 with the vertical wall surface 102 has a convex curved surface shape when viewed from the side surface of the aircraft body 12 (aircraft 10). Accordingly, it is possible to reduce the contact area of the contact surface 42A with respect to the vertical wall surface 102. Therefore, although the rotation shaft 44 of the roller 42 is inclined with respect to the vertical direction when viewed from the front of the aircraft body 12 (aircraft 10) by the fact that the aircraft body 12 is inclined to a side where the aircraft body 12 moves in the left and right direction, the rotation of the pair of rollers 42 may be secured.

Further, the inner frame 21 of the frame 20 has the pair of front and rear connecting members 22 that extend in the front and rear direction, and the pair of left and right connecting members 23 that extend in the left and right direction, and has the frame shape when viewed from the top. Then, the plurality of motors 41A to 41D are fixed to the intersecting portions 24A to 24D of the pair of front and rear connecting members 22 and the pair of left and right connecting members 23, respectively. Accordingly, although the rotating wings 40A to 40D that are adjacent to each other in the front and rear direction or the left and right direction of the aircraft 10 among the plurality of rotating wings 40A to 40D rotate in different directions with each other, vibrations of the adjacent rotating wings 40A to 40D are transmitted to each other through the portions of the inner frame 21 positioned between the adjacent rotating wings 40A to 40D. Therefore, it is possible to eliminate the vibrations of the adjacent rotating wings 40A to 40D (motors 41A to 41D).

Further, the outer frame 31 of the frame 20 has the rectangular frame shape that surrounds the inner frame 21 when viewed from the top, and includes the outer frame portion 35 that is connected with the inner frame 21. Accordingly, the vibrations of the adjacent rotating wings 40A to 40D are also transmitted to each other through the outer frame portion 35. Therefore, it is possible to eliminate the vibrations of the adjacent rotating wings 40A to 40D (motors 41A to 41D) more efficiently.

Subsequently, modifications of the embodiment will be described.

In the embodiment, the inner frame 21 of the aircraft body 12 that supports the plurality of rotating wings 40A to 40D and the plurality of motors 41A to 41D is fixed to the outer frame 31 that includes the pair of annular members 33 that support each of the wheels 50 and each of the rollers 42. However, the inner frame 21 that supports the plurality of rotating wings 40A to 40D and the plurality of motors 41A to 41D may be rotatably supported around the axis that extends in the front and rear direction of the aircraft body 12, with respect to the outer frame 31 that includes the pair of wheel members 33. In this case, the inner frame 21 corresponds to the aircraft body 12.

With such a configuration, when the aircraft 10 is moved along the vertical wall surface 102, the outer frame 31 provided with the pair of rollers 42 is maintained in the horizontal state even if the inner frame 21 serving as the aircraft body 12 is inclined to a side where the inner frame 21 moves in the left and right direction. Therefore, the pair of rollers 42 may be rotated smoothly.

Further, although the pair of rollers 42 are provided at the aircraft body 12 in the embodiment, another pair of rollers that are arranged vertically with the pair of rollers 42 may be provided at the aircraft body 12.

Further, although the number of the plurality of rotating wings 40A to 40D are four, but the number may be two or three, or may be five or more. Further, the number of the plurality of motors 41A to 41D are two or three, or five or more in response the number of the plurality of rotating wings 40A to 40D.

Further, both of the left and right ends of the pair of left and right connecting members 23 are terminated at the connecting portion with the pair of front and rear connecting members 22. However, both of the left and right ends of the pair of left and right connecting members 23 may be connected with the plurality of spokes 34A to 34F on both of the left and right sides, respectively, beyond the connecting portions with the pair of front and rear connecting members 22. Then, the inner frame 21 which is an example of "the first frame" may have a lattice shape when viewed from the top.

Further, although the outer frame portion 35 which is an example of "the second frame" has the rectangular frame shape when viewed from the top, the outer frame portion 35 may have a frame shape other than a rectangular shape when viewed from the top.

Although the aircraft 10 moves on the vertical wall surface 102 formed at the bridge pier 101 of the bridge 100 in the example of method for using the aircraft 10 described above, the aircraft 10 may move the vertical wall surface 102 formed other than the bridge pier 101 of the bridge 100.

Further, although the vertical wall surface 102 is photographed by using the aircraft 10 having the camera 84, the operation performed by the aircraft 10 on the vertical wall surface 102 may be at least one of inspection, observation, recording, checking, transportation, painting, marking, and other operations other than photographing.

Further, modifications that are combinable among the plurality of modifications may be appropriately combined and implemented.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:
1. An aircraft comprising:
an aircraft body provided with:
   a plurality of rotating wings,
   a plurality of motors that rotates the plurality of rotating wings,
   a pair of annular members each forming an annular shape rotatably around an axis which extends in a left and right direction of the aircraft body and arranged on respective right and left sides of the aircraft body, and
   a support rod which extends in the left and right direction of the aircraft body between the annular members;
a pair of wheels (50) each arranged over an entire circumference of the respective annular members and rotatably around the axis that extends in the left and right direction of the aircraft body;
a pair of rollers (42) that each protrudes forward and upward with respect to each of the wheels in the left and right direction of the aircraft body from the respective annular members and are rotatably supported by support members (43) which are provided at the pair of annular members (33) around an axis that extends in a tangential direction of each of the wheels;
a plurality of sensors that detect an object around the aircraft; and
a control circuit that controls, when detecting that the pair of wheels are brought into contact with a vertical wall surface based on a detection result from the plurality of sensors, a rotation speed of the plurality of motors based on a command signal from a remote control unit to make the aircraft body being in a forward inclined posture such that the pair of rollers are not brought into contact with the vertical wall surface and make the aircraft body move in the vertical direction while the aircraft body maintains the forward inclined posture or to make the aircraft body being in a forward inclined posture such that the pair of rollers are brought into contact with the vertical wall surface and make the aircraft body move in the left and right direction along the vertical wall surface while the pair of rollers run on the vertical wall surface.

2. The aircraft according to claim 1, wherein an outer peripheral surface of each of the rollers to be contacted with the vertical wall surface forms a convex curved surface.

3. The aircraft according to claim 1, further comprising:
a first frame corresponding to an inner frame of a frame which is a part of a skeleton of the aircraft body and having a frame shape when viewed from a top of the aircraft body in an up and down direction of the aircraft body, and including a plurality of front and rear connecting members that extend in a front and rear direction, and a plurality of left and right connecting members that extend in the left and right direction and intersect with the plurality of front and rear connecting members; and
a second frame having a frame shape that surrounds the first frame when viewed from the top of the aircraft body in the up and down direction of the aircraft body, and connected to the first frame, wherein the plurality of motors are respectively fixed to a plurality of intersecting portions of the plurality of front and rear connecting members and the plurality of left and right connecting members.

4. A method of controlling an aircraft comprising:
preparing the aircraft including:
an aircraft body provided with:
a plurality of rotating wings,
a plurality of motors that rotates the plurality of rotating wings,
a pair of annular members each forming a annular shape rotatably around an axis which extends in a left and right direction of the aircraft body and arranged on respective right and left sides of the aircraft body, and
a support rod which extends in the left and right direction of the aircraft body between the annular members;
a pair of wheels arranged over an entire circumference of the respective annular members and rotatably around the axis that extends in the left and right direction of the aircraft body;
a pair of rollers that each protrudes forward and upward with respect to each of the wheels in the left and right direction of the aircraft body from the respective annular members and are rotatably supported by support members which are provided at the pair of annular members around as an axis that extends in a tangential direction of each of the wheels; and
a plurality of sensors that detect an object around the aircraft; and
controlling, when detecting that the pair of wheels are brought into contact with a vertical wall surface based on a detection result from the plurality of sensors, a rotation speed of the plurality of motors based on a command signal from a remote control unit to make the aircraft body being in a forward inclined posture such that the pair of rollers are not brought into contact with the vertical wall surface and make the aircraft body move in the vertical direction while the aircraft body maintains the forward inclined posture or to make the aircraft body being in a forward inclined posture such that the pair of rollers are brought into contact with the vertical wall surface and make the aircraft body move in the left and right direction along the vertical wall surface while the pair of rollers run on the vertical wall surface.

5. The method according to claim 4 comprising:
receiving, from the remote control unit, a movement command signal indicating a vertical direction movement or a left and right direction movement after detecting that the pair of wheels are brought into contact with the vertical wall surface; and
control a movement of the aircraft body based on the movement command signal.

6. The method according to claim 5 comprising:
controlling the rotation speed of the plurality of motors which are arranged at a front side and a rear side of the aircraft body in a front and rear direction of the aircraft body in such a manner that the rotation speed of motors at a rear side of the plurality of motors is higher than the rotation speed of motors at a front side of the plurality of motors.

* * * * *